United States Patent [19]

Kume et al.

[11] Patent Number: 4,494,168
[45] Date of Patent: Jan. 15, 1985

[54] ROLL TYPE CAPACITOR HAVING SEGMENTED METALLIZED AREAS

[75] Inventors: Nobuyuki Kume; Harumi Yoshino, both of Matsue; Miyuki Nagaoka, Hirata, all of Japan

[73] Assignee: Matsushita Electric Industrial Company, Limited, Japan

[21] Appl. No.: 337,400

[22] Filed: Jan. 6, 1982

[30] Foreign Application Priority Data

Jan. 7, 1981 [JP] Japan ................................. 56-1525
Jan. 7, 1981 [JP] Japan ................................. 56-1527

[51] Int. Cl.³ ...................... H01G 1/017; H01G 1/015
[52] U.S. Cl. ................................. 361/273; 361/304
[58] Field of Search ............ 361/273, 275, 304, 306, 361/308, 323

[56] References Cited

U.S. PATENT DOCUMENTS

| | | | |
|---|---|---|---|
| 2,216,558 | 10/1940 | Ortlieb | 361/304 X |
| 2,216,559 | 10/1940 | Ortlieb | 361/273 X |
| 2,301,882 | 11/1942 | Kappeler | 361/304 X |
| 2,716,180 | 8/1955 | Dubilier | 361/304 X |
| 3,214,657 | 10/1965 | Davis | 361/273 |
| 3,298,864 | 1/1967 | Maylandt | 361/273 |
| 3,513,368 | 5/1970 | Boyer | 361/275 |

FOREIGN PATENT DOCUMENTS

| | | | |
|---|---|---|---|
| 125249 | 5/1945 | Australia | 361/273 |
| 33-8228 | 9/1958 | Japan . | |
| 558686 | 1/1944 | United Kingdom | 361/304 |
| 705353 | 3/1954 | United Kingdom | 361/273 |
| 1324010 | 7/1973 | United Kingdom | 361/275 |

OTHER PUBLICATIONS

Grouse "Interim Report on the Metallized Products Co. High Voltage Metallized Capacitor" Brochure Met. Prod. Co. Norwalk, Conn. 7/63 pp. 1-5 Neziedon.

*Primary Examiner*—Donald A. Griffin
*Attorney, Agent, or Firm*—Lowe, King, Price & Becker

[57] ABSTRACT

A pair of laminated metallized films is convolutely wound into a roll. The metallized area of each dielectric film is segmented into a plurality of longitudinally spaced apart metallized areas which are connected together to an electrode. The separation between successive metallized areas is in a range from 0.1 mm to 5.0 mm and the interval between successive separations is from 10 mm to 500 mm to assure a 100% guaranty. A first of the metallized areas extends transversely from a first non-metallized marginal area to the opposite edge of a first dielectric film. A second of the metallized areas extends transversely from the second non-metallized marginal area to the opposite edge of a second dielectric film. First and second electrodes are respectively connected to edges of the first and second metallized areas.

10 Claims, 19 Drawing Figures

ROLL TYPE CAPACITOR HAVING SEGMENTED METALLIZED AREAS

BACKGROUND OF THE INVENTION

The present invention relates generally to metallized capacitors, and more specifically to a metallized capacitor having a roll of laminated dielectric films each being formed with a plurality of longitudinally spaced apart conductive segments.

Conventional metallized capacitors are broadly classified into roll and stack types. In the roll type, a dielectric film is vacuum evaporated with a continuous length of conductive layer and laminated with a similarly vacuum-evaporated dielectric film and the lamination is convolutely wound into a roll. Each dielectric film is provided with a marginal non-metallized area extending along one edge thereof which is opposite to the marginal area of the other film. On each end face of the roll is welded a conductive material so that it establishes an electrical connection with an associated one of the rolled conductive layers. In the stack type metallized capacitor, a plurality of metallized films, each having a non-metallized marginal area, is stacked one on each other so that each dielectric layer is sandwiched between conductive layers and marginal areas occur alternately on opposite edges of the stacked construction. A conductive material is welded to the opposite edges of the stacked construction to establish electrical connection to alternate conductive layers.

The roll type capacitor has an advantage in that it permits capacitors to be manufactured with each, but a disadvantage in that slight damage in a local area spreads to all parts of the capacitor and eventually leads to damage of the whole capacitor due to the physically integral construction of conductive layers. Thus, the roll type capacitor additionally requires a safety assurance device such as current fuse or temperature fuse to prevent total failure of the capacitor. On the other hand, due to the physical separation of the conductive layers, damage in the stack type can be confined to a local area. However, the disadvantage of the latter resides in the manufacture which compares unfavorably with the roll type.

SUMMARY OF THE INVENTION

A primary object of the present invention is to provide a metallized capacitor of rolled construction which combines the safety assurance feature of the stack type while retaining the manufacturing advantage of the rolled construction.

The metallized capacitor of the invention comprises a pair of laminated dielectric films convolutely wound into a roll, each of the dielectric films being formed on one surface thereof with a plurality of metallized areas longitudinally spaced apart by separations of 0.1 mm to 5.0 mm, the interval between successive ones of the separations being 10 mm to 500 mm. Each of the dielectric films is formed with a non-metallized marginal area longitudinally extending along one edge thereof which is opposite to the non-metallized marginal area of the other dielectric film, the roll being provided on each end thereof with means for electrically connecting the metallized areas of each of the dielectric films to respective electrodes.

BRIEF DESCRIPTION OF THE DRAWINGS

The invention will be described in further detail with reference to the accompanying drawings, in which.

DETAILED DESCRIPTION

Figure 1:
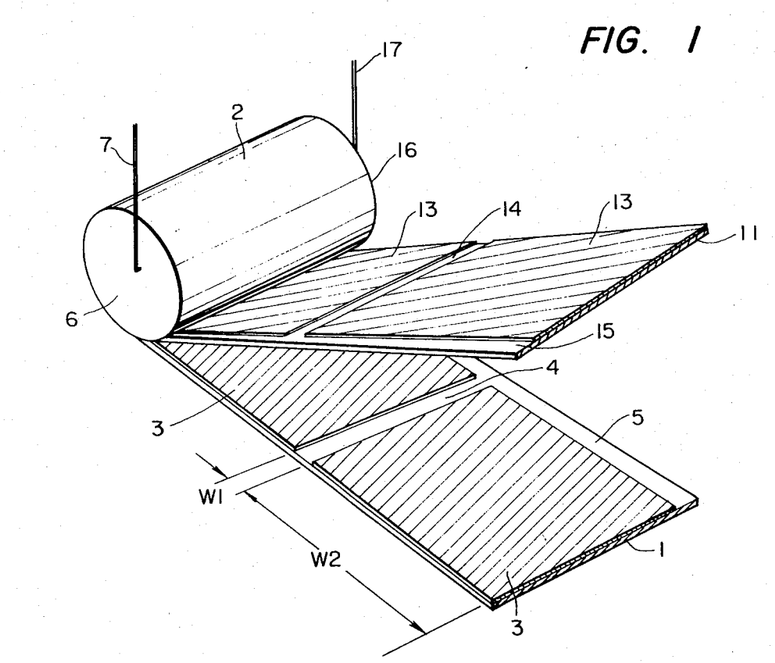
FIG. 1 is a perspective view of the metallized capacitor of the present invention.

In FIG. 1, a metallized capacitor of the present invention is shown as comprising a pair of pliable elongated films 1 and 11 of a dielectric material, such as propylene, polyesther or polycarbonate; the films are laminated and convolutely wound into a roll 2. On the inner surface of film 1 is deposited a plurality of longitudinally spaced apart segmented conductive films 3 which are typically shown in the form of rectangles separated by transversely extending non-metallized areas 4. The conductive films are deposited by vacuum evaporation or sputtering technique so that they are offset from the right edge of the nonconductive film 1 to leave a non-metallized marginal area 5. In a similar manner, the inner surface of nonconductive film 11 is provided with longitudinally spaced apart segmented metallized films 13 which are separated by transversely extending non-metallized areas 14 and offset from the left edge of the nonconductive film 11 to leave a marginal area 15. The nonconductive films 1 and 11 are laminated so that the conductive segments on each surface of the film 11 correspond to the conductive segments on the other surface. The preferred width value of each marginal area is 0.5 mm to 5 mm.

The marginal areas 5 and 15 thus occur in alternate fashion when the laminated films are wound into a roll. The opposite sides 6, 16 of the roll 2 are welded with layers 6, 16 of conductive material such as Zn, Sn, Cu or Pb to which conductors 7 and 17 are connected. Due to the alternately arranged non-metallized marginal areas, the conductor 7 is connected to all the metallized segments 3, while the conductor 17 is connected to all the metallized segments 13.

The metallized capacitor of the invention thus combines the manufacturing benefit of rolled construction with the safety feature of stacked construction, whereby a breakdown in any of the conductive segments and a resultant self-healing process can be localized and spreading of the self-healing process to adjacent segments is effectively prevented.

However, it is found that the reliability of the metallized capacitor and the capacitor's storage function can be satisfied at the same time only when the width $W1$ of each separation between adjacent conductive segments is appropriately determined in relation to the interval $W2$ between successive separations. Various tests were conducted to ascertain these values.

Figure 2:
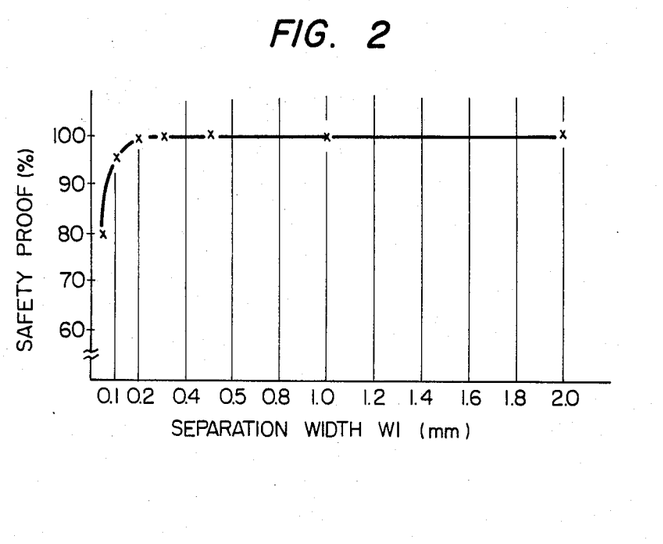
FIG. 2 is a graphic representation of safety tests conducted to ascertain the range of widths of separation between conductive segments that assures a 100% guaranty.

FIG. 2 is a graphic illustration of the results of safety, proof tests in which high voltages of 1.5 to 3.0 times the working voltage were applied to 10-microfarad, 150-volt rated metallized capacitors heated to a temperature ranging from room temperature to 120 degrees centigrade. The conductive segments were formed on a 5-micrometer thick polyester film with a given constant value of separation interval $W2$. The percentage value of the capacitors which passed the tests is plotted against separation widths $W1$.

Figure 3:
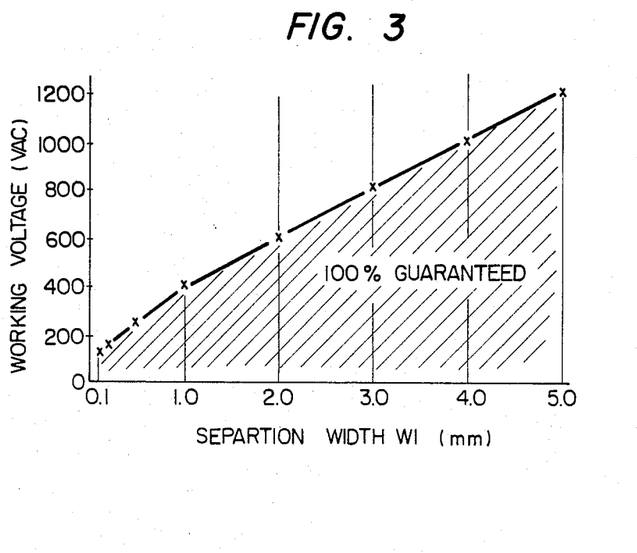
FIG. 3 is a graphic representation of overvoltage tests conducted to ascertain the range of widths of the separation that assures a 100% guaranty.

In FIG. 3, voltages of up to 1200 volts are plotted as a function of separation $W1$. The high voltage tests excluded the application of higher voltages than 1200 volts since this voltage is the current highest working voltage and the needs for capacitors having higher working voltages are usually met with a parallel connection of two or more 1200-volt rated capacitors. The plotted curve indicates minimum values of separation $W1$ for given values of applied voltage. In other words, the hatched area indicates that 100% capacitors withstand the voltages that intersect the curve. It is seen that failures occur at an increasing rate as an inverse function of the width of separation $W1$. This is due to the fact that the applied high voltage may find a discharge path across the separation areas 4, 14 to an open-circuited conductive segment in which self-healed breakdowns have occurred causing it to be burned out to the detriment of all the conductive segments of the capacitor and that capacitors having a smaller separation gap have a higher rate of occurrences of such discharges than those having a larger value of separation. From FIGS. 2 and 3 it follows that the separation width $W1$ should be in a range from 0.1 mm to 5.0 mm.

It is also found that the separation interval $W2$ plays an important role in assuring both safety proof and capacitor performance.

Figure 4:
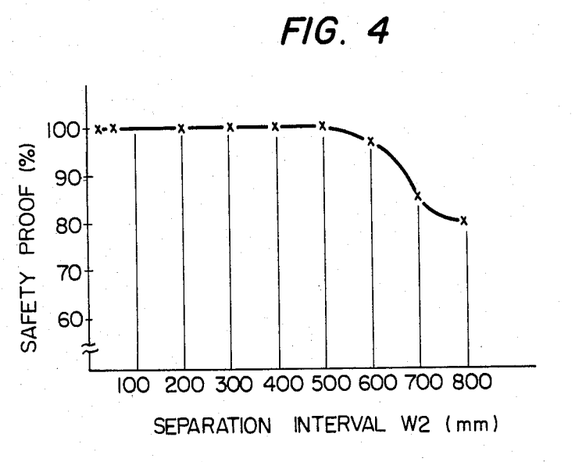
FIG. 4 is a graphic representation of safety, proof tests conducted to ascertain the range of separation intervals that assures a 100% guaranty.

Second safety, proof tests similar to the previous safety proof tests were applied to capacitors of the identical construction to those used in the previous tests with the exception that the capacitors have a given constant value of separation $W1$ but different values of separation interval $W2$. FIG. 4 is a graph of the results of the second safety proof tests. It is seen that capacitors having separation interval of more than 500 mm have a poor reliability.

Figure 5:
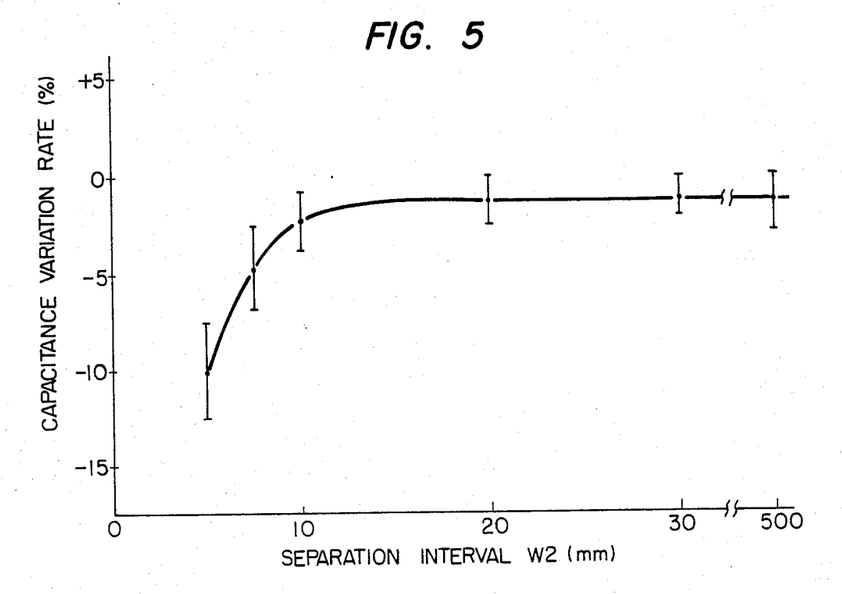
FIG. 5 is a graphic illustration of capacitance variation rates as a function of separation intervals.

Durability tests were conducted on the same capacitors as used in the second safety proof tests within an environment of 85 degrees centigrade by application of a voltage 1.5 times the rated value for a period of two seconds with an interruption of two seconds for each cycle. The tests were repeated 100,000 cycles. FIG. 5 is a chart of the results of the durability tests in which the rate of variation of the capacitance with respect to the initial value is plotted as a function of separation interval $W2$. It is seen from FIG. 5 that capacitors having a separation interval $W2$ smaller than 10 mm are found to be not suitable. From FIGS. 4 and 5, it follows that the separation interval $W2$ must be in a range between 10 mm and 500 mm.

Figure 6:
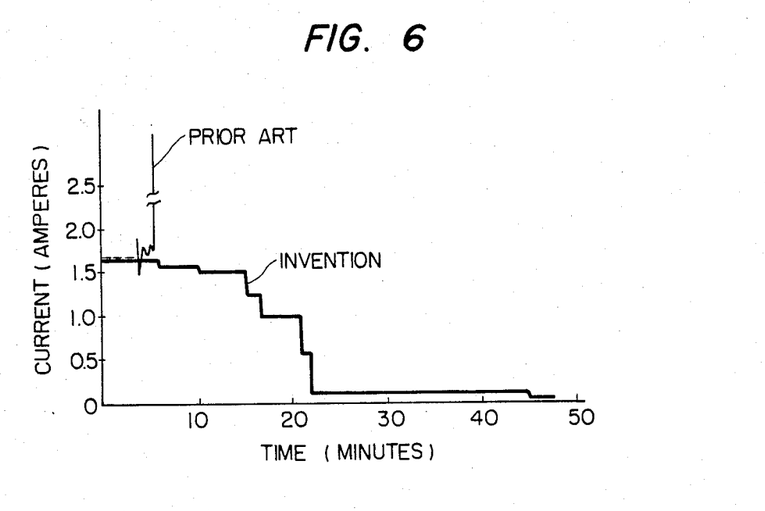
FIG. 6 is a graphic illustration of current variation rates with respect to time in response to application of overvoltages for comparison with the prior art roll type metallized capacitor.

Comparative tests were conducted between a prior art rolled metallized capacitor with a capacity of 15 microfarads and a rated voltage of 120 volts and a capacitor of the same operating parameters constructed according to the invention with a separation width $W1$ of 0.5 mm and a separation interval $W2$ being 15 mm. The comparative tests involved continued application of 300 volts AC to the capacitors while they were heated to a temperature of 120 degrees centigrade and measurement of current which was plotted as a function of time as shown in FIG. 6. From FIG. 6, the prior art capacitor current rapidly increased a few minutes after the application of high voltage that burned the capacitor. On the other hand, the capacitor current value of the invention gradually decreased for an initial 15-minute period; the gradual decrease followed by a higher rate of current decrease until the capacitor became completely open-circuited, although a slight swelling was noticed.

Figure 7:
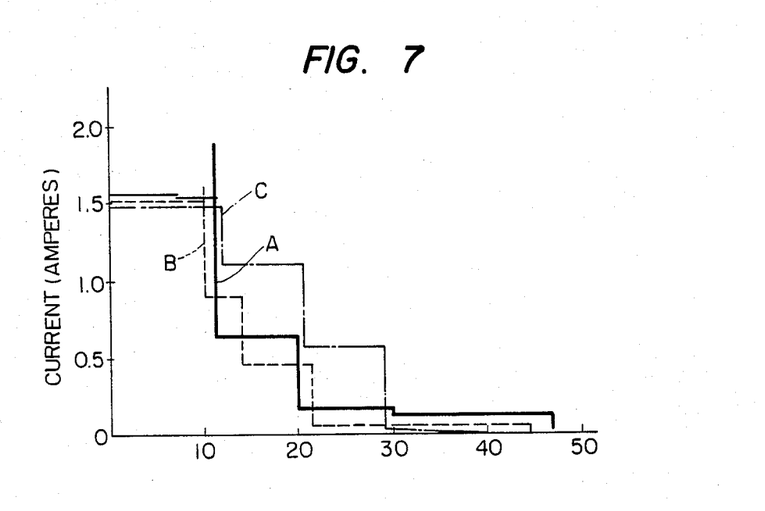
FIG. 7 is a graphic illustration of current variation rates with respect to time in response to application of overvoltages to metallized capacitors of the invention having different values of separation interval.

Current measurement tests were also conducted. In these tests a voltage of 500 to 600 volts AC was continuously applied to 7-microfarad, 290-volt rated capacitors, heated to a temperature of 120 degrees centigrade and having the conductive segments vacuum evaporated on a 7.5-micrometer thick polypropylene film with a separation width $W1$ of 1 mm and separation intervals $W2$ of different values. The results were plotted in FIG. 7 in which curves A, B and C respectively indicate the characteristics of capacitors according to the invention having separation intervals $W2$ of 300 mm, 100 mm and 50 mm. Thirty minutes after application of the test voltage the initial current decreased considerably and thereafter all the capacitors became open-circuited. No burning was noticed in any one of the tested capacitors. From the manufacturing standpoint the preferred value of $W1$ is found to be in a range from 0.2 mm to 2.0 mm and the preferred value of $W2$ in a range from 10 mm to 100 mm.

Figure 8:
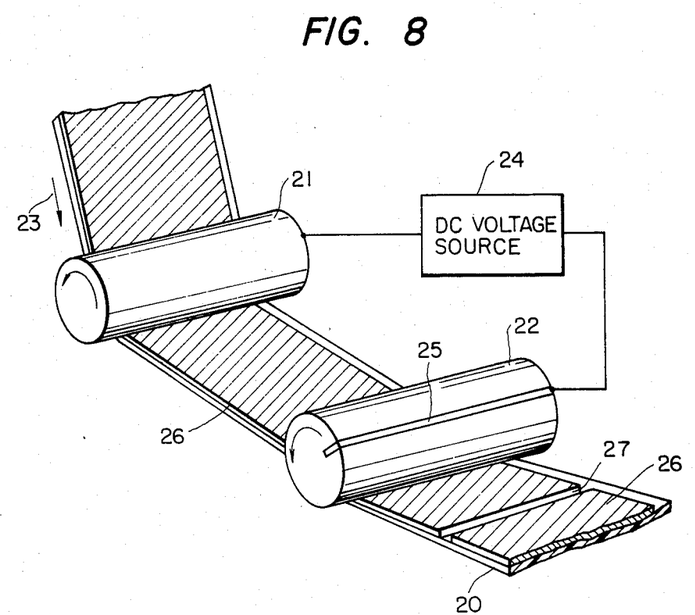
FIG. 8 is an illustration of a part of apparatus for practicing the invention.

FIG. 8 is an illustration of a method of forming the non-metallized area. A metallized film 20 is supported between rollers 21 and 22 and pulled by a suitable means, not shown, in a direction as indicated by an arrow 23. The upstream roller 21 has a conductive cylindrical surface which is coupled to a terminal of a DC voltage source 24, while the downstream side roller 22 has an insulative cylindrical surface in which a transversely extending metal strip 25 is embedded. The metal strip 25 is coupled to another terminal of the voltage source 24 so that arc discharge occurs along the strip 25 when the latter comes into contact with the metallized area 26 at each revolution of the roller 22 to create a non-metallized area 27.

Figure 9:
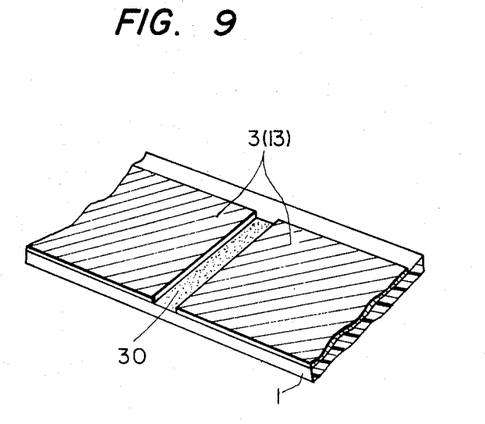
FIG. 9 is a fragmentary view of a metallized film of another embodiment of the invention.
Figure 10:
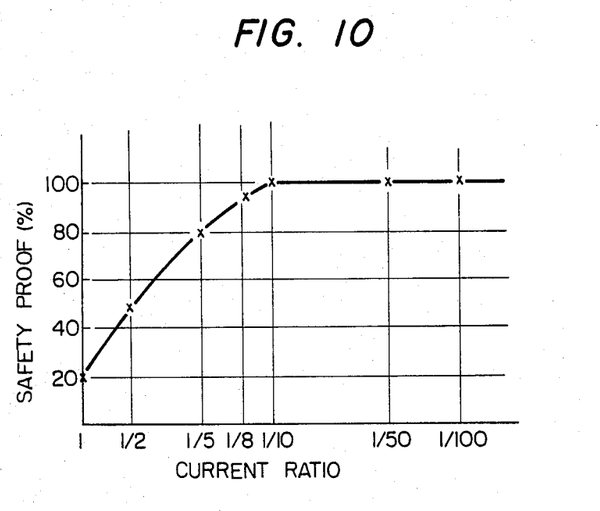
FIG. 10 is a graphic illustration of safety, proof tests conducted to ascertain the ratios of current capacity of resistive region to that of metallized area which ensure a 100% guaranty.
Figure 11:
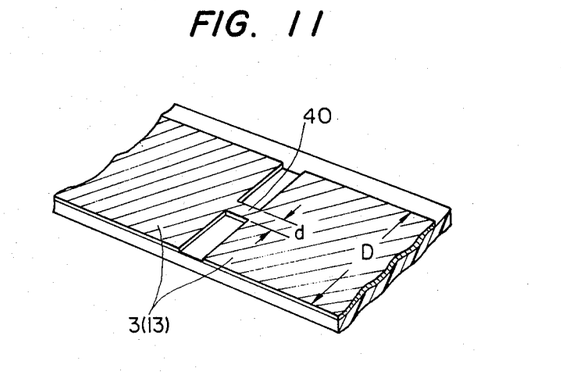
FIG. 11 is an illustration of a modified form of the embodiment of FIG. 9.

In another embodiment of the invention, the metallized areas are formed by vacuum evaporation of a conductive material through a mask. The non-metallized areas that separate the metallized areas are vacuum evaporated with a resistive material forming a resistive strip 30 as shown in FIG. 9. Safety, proof tests indicate that the current capacity of the resistive strip 30 needs to be lower than 1/10 of the current capacity of the conductive segments 3, 13 as indicated in FIG. 10. FIG. 11 shows an alternative form of the capacitor of the invention in which the resistive area is formed by a narrow conductive region 40 having a width "d" smaller than 1/10 of the width "D" of the conductive segments 3, 13.

Since the metallized capacitor according to the present invention localizes the damage within a single metallized segment, it is not necessary to provide a temperature fuse or any other safety assurance device within a common casing in which the capacitor is enclosed. Therefore, the encased metallized capacitor of the invention can be made smaller in size and more reliable than the prior art metallized capacitor. FIGS. 12 to 15 are illustrations of encased metallized capacitors as typical examples.

Figure 12A:
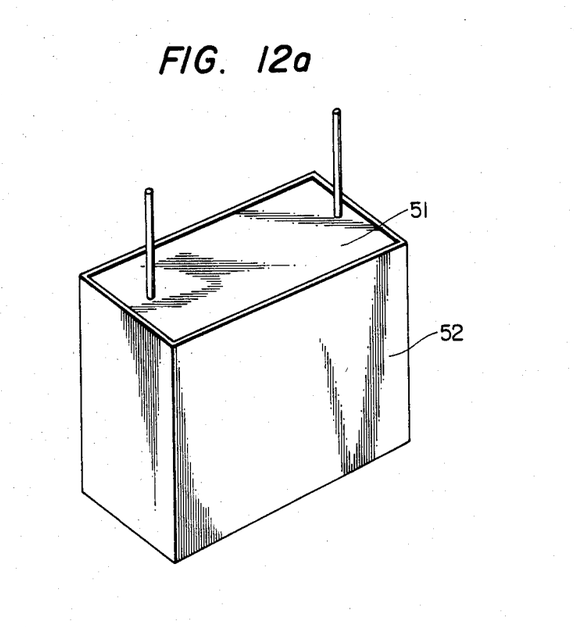
FIGS. 12 to 15 are illustrations of the rolled type metallized capacitors housed in various types of casing which is rendered compact by the elimination of the otherwise required safety assurance device.
Figure 12B:
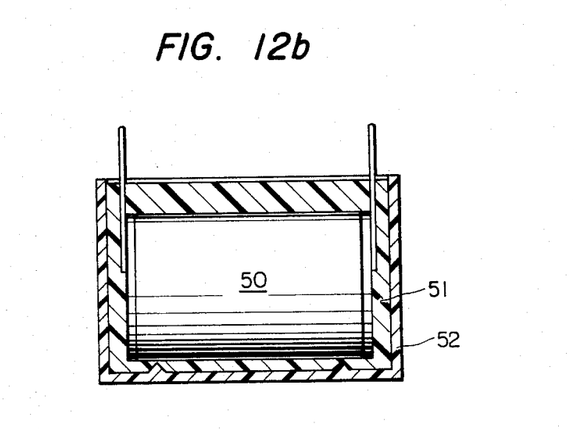
Figure 13A:
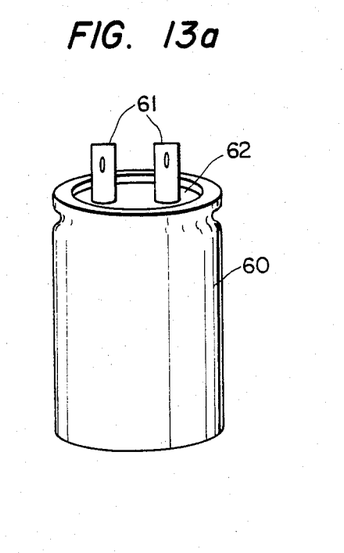
Figure 13B:
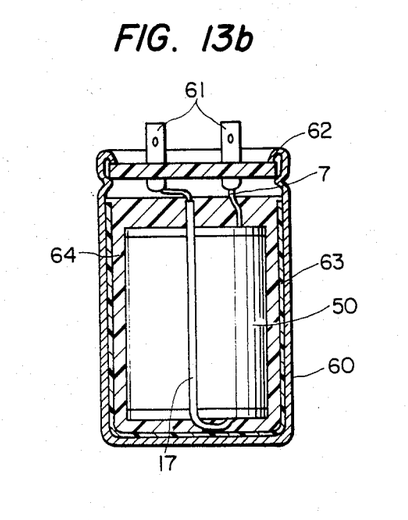
Figure 14A:
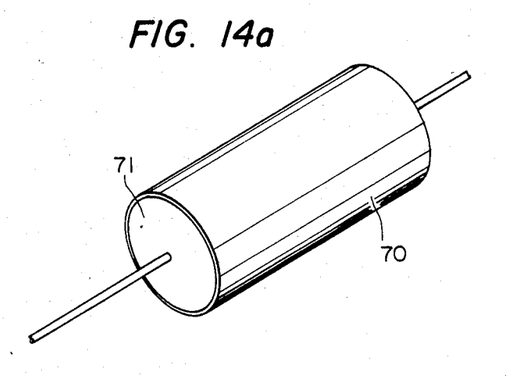
Figure 14B:
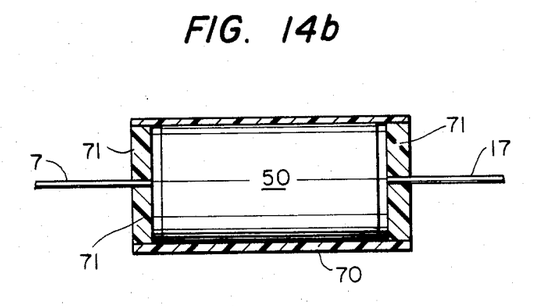
Figure 15A:
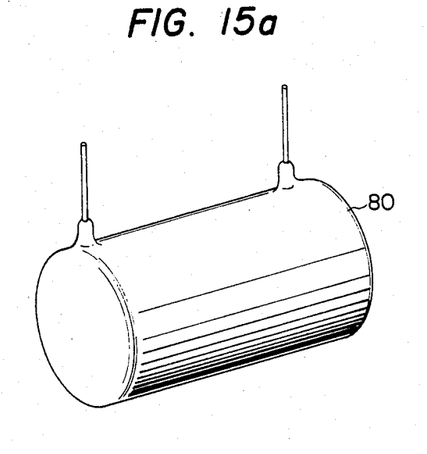
Figure 15B:
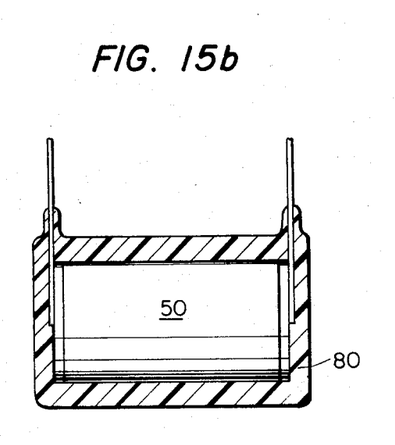

In FIGS. 12a and 12b, the metallized capacitor 50 of the invention is placed in a plastic casing 42 into which thermo-setting epoxy resin 51 is poured and allowed to cure so that the capacitor 50 is completely sealed. In FIGS. 13a and 13b, the metallized capacitor 50 is placed in a cylindrical metal casing 60 lined with an insulating sheet 63 with the electrodes 7, 17 extending to terminals 61 attached to a plastic cover member 62. Resin 64 is poured into the casing 60 and the cover 62 placed on top of the casing. As illustrated in FIGS. 14a and 14b an axial type capacitor is provided by wrapping the capacitor 50 with two to five turns of a polyester adhesive sheet 70 having a greater width than the length of capacitor 50 by 5 mm to 10 mm. The oversized portions of the sheet 70 at opposite ends of the capacitor are filled with resin to form end sealings 71. The metallized capacitor 50 may be dipped into liquid resin which is subsequently allowed to cure to form an outer coating 80 as shown in FIGS. 15a, 15b.

What is claimed is:

1. A metallized capacitor having a pair of electrodes, comprising, a pair of first and second laminated dielectric films convolutely wound into a roll, a plurality of first metallized areas on said first dielectric film, a plurality of second metallized areas on said second dielectric film, said first and second metallized areas being longitudinally spaced apart by separations of 0.1 mm to 5.0 mm, the interval between successive ones of said separations being 10 mm to 500 mm, said first dielectric film having a first non-metallized longitudinal marginal area on one edge thereof, said second dielectric film having a second non-metallized longitudinal marginal area on one edge thereof which is opposite to the first non-metallized marginal area, said first metallized areas extending transversely from said first non-metallized marginal area to the opposite edge of the first dielectric film so that it can be connected to one of said electrodes, said second metallized areas extending transversely from said second non-metallized marginal area to the opposite edge of the second dielectric film so that it can be connected to the other electrode, means provided on the opposite ends of said roll for electrically connecting the first and second metallized areas in parallel relationship to said electrodes, respectively, an electrically resistive region in each of said separations, said resistive region being formed by a metallized portion connected between adjacent metallized areas, said metallized portion having a transverse dimension smaller than one-tenth of the transverse dimension of the metallized areas.

2. A capacitor comprising first and second dielectric sheets having substantially the same width, a first set of metal elongated regions each having a width less than the width of the sheets, a second set of metal elongated regions each having a width less than the width of the sheets; the first and second dielectric sheets, and the first and second sets of elongated regions being wound on each other and arranged to form a roll having first and second opposite faces with successive turns of the roll consisting of: the first dielectric sheet, at least one region of the first set of metal regions, the second dielectric sheet and at least one region of the second set of metal regions; the first face including edges of the first sheet and edges of the metal regions of the first set and excluding any part of the metal regions of the second set; the second face including edges of the second sheet and edges of the metal regions of the second set but excluding any part of the metal regions of the first set, the regions of the first set being arranged in a first strip like array, adjacent regions of the first set having adjacent edges transverse to the longitudinal direction of the first strip, the adjacent edges of the regions of the first set being spaced from each other, the regions of the second set being arranged in a second strip like array, adjacent regions of the second set having adjacent edges transverse to the longitudinal direction of the second strip, the adjacent edges of the regions of the second set being spaced from each other, a first electrode extending along and abutting against the first face and electrically connected to the edges of the metal regions of the first set, a second electrode extending along and abutting against the second face and electrically connected to the edges of the metal regions of the second set, resistive regions between the adjacent spaced edges, the resistive regions having a current capacity of approximately one-tenth that of the metal regions of the first and second sets, the resistive regions comprising metal tabs abutting against the adjacent edges, the metal tabs having a width one-tenth that of the metal regions of the first and second sets.

3. A capacitor as claimed in claim 2, wherein the resistive regions comprise resistive strips extending between the metal regions of the first and second sets, the resistive strips having a current capacity.

4. A metallized capacitor having a pair of electrodes, comprising a pair of first and second films of dielectric material convolutely wound in overlapping relation into a roll, a first plurality of longitudinally separated metallized areas on said first film, a second plurality of longitudinally separated metallized areas on said second film, said first and second metallized areas being offset from the opposite edges of said first and second films to provide non-metallized longitudinal dielectric marginal regions respectively along said edges and extending transversely from respective non-metallized longitudinal dielectric marginal regions to the other edges so that electrical connections can be made from said electrodes to said first and second metallized areas, respectively, and means on each end of said roll for connecting said first and second metallized areas in parallel relationship to said electrodes, respectively, adjacent ones of the metallized areas being longitudinally separated by distances sufficient to provide 100 percent operational safety for a designed working voltage for the capacitor.

5. The metallized capacitor of claim 4 wherein the separation is in the range of 0.1 mm to 5.0 mm.

6. The metallized capacitor of claim 5 wherein the metallized areas have a length in the range of 10 mm to 500 mm which is sufficient to limit variations in the value of the capacitor to no more than 5 percent and are short enough to provide 100 percent operational safety.

7. The metallized capacitor of claim 4 wherein the metallized areas have a length sufficient to limit variations in the value of the capacitor to no more than 5 percent and are short enough to provide 100 percent operational safety.

8. The metallized capacitor of claim 7 wherein the length is in the range of 10 mm to 500 mm.

9. A metallized capacitor having a pair of electrodes, comprising a pair of first and second films of dielectric material convolutely wound in overlapping relation into a roll, a first plurality of longitudinally separated metallized areas on said first film, a second plurality of longitudinally separated metallized areas on said second film, said first and second metallized areas being offset from the opposite edges of said first and second films to provide non-metallized longitudinal dielectric marginal regions respectively along said edges and extending transversely from respective non-metallized longitudinal dielectric marginal regions to the other edges so that electrical connections can be made from said electrodes to said first and second metallized aeas, respectively, and means on each end of said roll for connecting said first and second metallized areas in parallel relationship to said, electrodes, respectively, the metallized areas having a length sufficient to limit variations in the value of the capacitor to no more than 5 percent and are short enough to provide 100 percent operational safety.

10. The metallized capacitor of claim 9 wherein the length is in the range of 10 mm to 500 mm.

* * * * *